United States Patent
Leibbrand et al.

(10) Patent No.: US 7,654,800 B2
(45) Date of Patent: Feb. 2, 2010

(54) MOBILE CONCRETE PUMP AND CORRESPONDING BUILDING FRAME

(75) Inventors: Joachim Leibbrand, Engelsbrand (DE); Dieter Schneider, Filderstadt (DE); Hellmut Hurr, Reutlingen (DE)

(73) Assignee: Putzmeister Concrete Pumps GmbH, Aichtal (DE)

( * ) Notice: Subject to any disclaimer, the term of this patent is extended or adjusted under 35 U.S.C. 154(b) by 753 days.

(21) Appl. No.: 10/530,001

(22) PCT Filed: Sep. 17, 2003

(86) PCT No.: PCT/EP03/10314

§ 371 (c)(1),
(2), (4) Date: Mar. 31, 2005

(87) PCT Pub. No.: WO2004/033822

PCT Pub. Date: Apr. 22, 2004

(65) Prior Publication Data

US 2005/0271522 A1    Dec. 8, 2005

(30) Foreign Application Priority Data

Oct. 4, 2002   (DE) ............................... 102 46 447

(51) Int. Cl.
*F04B 53/00* (2006.01)
*B60P 3/16* (2006.01)
*E04G 21/04* (2006.01)

(52) U.S. Cl. ................. 417/234; 417/572; 417/900; 280/763.1

(58) Field of Classification Search ............ 417/234, 417/572, 900; 280/763.1
See application file for complete search history.

(56) References Cited

U.S. PATENT DOCUMENTS 3,532,442 A * 10/1970 Van Der Plaats ............ 417/345

(Continued)

FOREIGN PATENT DOCUMENTS

DE    20 03 519 A    8/1970

(Continued)

OTHER PUBLICATIONS

English Translation of Abstract of Takayuki JP 11245710.*

(Continued)

*Primary Examiner*—Devon C Kramer
*Assistant Examiner*—Leonard J Weinstein
(74) *Attorney, Agent, or Firm*—Patent Central LLC; Stephan A. Pendorf (57) ABSTRACT

A mobile concrete pump including a building frame (22) arranged on the structure (12) of a truck chassis (10). The building frame (22) includes two longitudinal side members (50) mutually spaced apart by a free space (52) and resting on the chassis structure (12). The mobile concrete pump further comprises a driving assembly (42) for actuating the functional units, which are arranged with the core pump (24) in the free space zone (52) located between the two longitudinal side members (50). At least the core pump can be easily mounted and dismounted from the building frame (22). For this, the building frame (22) is provided with a floating bearing (54) which links the side members across the free space, as well as a fixed bearing (56) arranged at the rear end of the building frame and serving to support releasably the core pump (24) which is pre-assembled in modular manner.

25 Claims, 9 Drawing Sheets

U.S. PATENT DOCUMENTS

| | | | | | |
|---|---|---|---|---|---|
| 4,619,369 | A | * | 10/1986 | Mertens | 212/304 |
| 5,029,895 | A | * | 7/1991 | Anderson | 280/764.1 |
| 5,062,369 | A | * | 11/1991 | Cobden et al. | 105/396 |
| 5,460,301 | A | * | 10/1995 | Ebinger et al. | 222/626 |
| 5,553,673 | A | * | 9/1996 | Hackman | 169/24 |
| 6,390,504 | B1 | * | 5/2002 | Fetzer | 280/763.1 |
| 6,520,750 | B2 | * | 2/2003 | Eller et al. | 417/234 |
| 6,834,911 | B2 | * | 12/2004 | Schillinger et al. | 296/193.07 |
| 2004/0016359 | A1 | * | 1/2004 | Allen | 104/137 |

FOREIGN PATENT DOCUMENTS

| | | | |
|---|---|---|---|
| DE | 31 22 725 | A1 | 12/1982 |
| DE | 3128496 | A1 * | 2/1983 |
| DE | 29 40 683 | C2 | 6/1986 |
| FR | 2597056 | A1 * | 10/1987 |
| JP | 10 176 418 | A | 6/1998 |
| JP | 11245710 | A * | 9/1999 |

OTHER PUBLICATIONS

English Translation of Abstract of Fenzl et al. DE 3128496.*

* cited by examiner

MOBILE CONCRETE PUMP AND CORRESPONDING BUILDING FRAME

CROSS REFERENCE TO RELATED APPLICATION

This application is a national stage of PCT/EP2003/010314 filed Sep. 17, 2003 and based upon DE 102 46 447.2 filed Oct. 4, 2002 under the International Convention.

BACKGROUND OF THE INVENTION

1. Field of the Invention

The invention concerns a mobile concrete pump comprising a building frame seated on the structure of a truck chassis, the building frame comprising two longitudinal side members mutually spaced apart by a free space and resting on said chassis structure, the building frame serving to receive a supporting device, a core pump with material supply container and functional units which form a distribution mast, as well as a driving assembly for actuating the functional units, which are arranged along with the core pump in the free space zone located between the two longitudinal side members. The invention further concerns a building frame for mobile concrete pumps.

2. Related Art of the Invention

In mobile concrete pumps a prefabricated building frame is seated upon the structure of a truck chassis and connected therewith. The drive subassemblies for activating the functional units, during operation of the pump, are coupled to the truck motor via an auxiliary drive or a distributor transmission. Depending upon the model of pump, the drive subassemblies may include one or more hydraulic pumps as well as additional auxiliary pumps, for example for the drive of the stirring mechanism in the material supply container for the core pump.

As the core pump, generally a two cylinder piston pump is employed, which includes two drive cylinders and conveyor cylinders connected hydraulically with each other in pairs, of which the pistons are pair-wise rigidly connected with each other via a common piston rod which passes through a water box, and are driven in counter-stroke via a hydraulic drive.

Concrete is supplied via the material supply container, in which container a stirring mechanism and a pipe switch are located. The inward side of the pipe switch is alternatingly pivoted back and forth between the output side of the two conveyor cylinders, and communicates from it's output side with a conveyor line, which extends along a distribution mast. The distribution mast is preferably an articulated mast, which is mounted to be rotatable about 360° on a mast rotation mount block or pedestal provided in the front area of the building frame and which mast, in the folded together transport position, lies on a rear mast bearing block.

In known mobile concrete pumps the core pump is provided on the building frame in such a manner that it can be disassembled only with difficulty. It is conventionally welded on the building frame in the area of the water box. In order to be able to have access to the hydraulic aggregate of the drive subassembly, for example for repair purposes, the core pump and the drive aggregates must be disassembled. In order to be able to remove the drive aggregate, until now it had been necessary to completely disassemble the core pump. This is very labor intensive and time consuming. Besides this, due to the hydraulic fluid, it is possible for substantial complications to occur.

For various types and sizes of the functional units various drive subassemblies are necessary. The variations in construction resulting therefrom produce a large number of varying installation situations. Therein it must be taken into consideration that the core pump, in an early building stage, must be seated in the building frame and be welded therewith in the area of the water box. For this reason a prefabrication of the building frame is not possible without precise advance notice of the exact version or model of construction.

SUMMARY OF THE INVENTION

Beginning therewith it is the task of the present invention to improve the mobile concrete pumps with a building frame of the above described type in such a matter that the assembly of the functional units and the drive subassemblies is simplified and a prefabrication of the building frame is facilitated.

For solving this task, the combination of characterizing features as set forth in independent Patent Claims is proposed. The advantageous embodiments and further developments of the invention can be seen from the dependent claims.

In accordance with a first embodiment, the building frame includes a floating bearing bridging over the free space and a fixed bearing provided at its rearward end for releasable receiving of modular type pre-assembled core pump and the rigidly therewith connected material supply container. Thereby it is accomplished that the preassembled core pump can be introduced into the free space from the rearward end and be connected in simple manner with the bearing locations. A further improvement in this respect is achieved thereby, that the building frame includes slide rails leading to the mounting points for facilitating the assembly and disassembly of the core pump.

The floating bearing is preferably a cross beam bridging over the free space, upon which the core pump is seated or against which the core pump bears. In order to dampen vibrations occurring during the pumping process, the cross beam is provided with a bearing surface comprised of an elastomeric plastic. A further improvement in this regard is achieved when the core pump is supported, in the area of the floating bearing, sideways against the longitudinal side members by elastomeric plastic buffers in a cushioned manner. Further, the core pump can be secured against lifting off from the floating bearing. For this purpose the core pump can include, for prevention of lifting off, for example at least one capture mechanism connectible with the floating bearing, for example, a capture hook, bent lever, wedge plug or lynch pin catch mechanism. The core pump, which is preferably a hydraulically driven two cylinder piston pump, includes a water box through which the piston rods pass and with which it is seated upon the floating bearing.

In order to be able to receive various sizes of core pumps, the floating bearing can be positioned at various locations provided spaced apart longitudinally on the longitudinal side member. For this, the cross beam which forms the floating bearing is rigidly connected to the longitudinal side members, preferably is welded or is secured by threaded fasteners.

In accordance with a further preferred embodiment of the invention it is envisioned that the hydraulic and electric control and circuit elements for the drive subassemblies and for the functional units connected thereto are collectively assembled on a control module provided at the rearward area of the building frame. For this the control module preferably includes the hydraulic valves and/or a hydraulic reservoir necessary for control, preferably assembled together in a hydraulic control block. The hydraulic lines leading to the drive subassembly for the control module are preferably run along the inner surface of the longitudinal side member of the building frame.

A preferred or alternative embodiment of the invention envisions that the building frame includes mounting means for the releasable receiving of carrier frames of various sizes, bridging over the free space, and equippable modularly with various drive subassemblies. This can be accomplished for example in that the building frames are provided, on the inner surfaces of the longitudinal side members facing the free space, with mounting rails extending in the longitudinal direction, that on the longitudinal side members respectively at least two journal bearings are provided spaced apart from each other, projecting transverse to the free space, for receiving the carrier frame for the drive subassembly, and that the journal bearings respectively include a base plate, with which they are releasably securable to the mounting rail.

By this means it is possible to prefabricate the building frame even without knowing the drive subassemblies to be employed later. This is accomplished above all in that the mounting rails include multiple screw bore holes open transverse to the free space, with detents separated longitudinally from each other with defined spacing, and that the base plates exhibit at least two through holes for securing screws spaced apart from each other in the detent separation of the screw bore holes. The detent separation between the screw bore holes can be so selected, that a group of detent positions is provided which satisfies all carrier frames existing as a practical matter, to which the mounting pins can be subsequently secured.

A further preferred embodiment of the invention envisions that the mounting rails exhibit a square profile, and that the base plates exhibit on their broad side opposite to the journal bearing a cross section opening which is edge open complimentary to the square profile of the mounting rails, with which they are form fittingly or engagingly seatable upon the mounting rails and fixable with the securing screws.

In order to be able to position the journal bearings in various heights relative to the mounting rails, it is proposed in accordance with a further advantageous embodiment of the invention, that the journal bearing is eccentric with regard to the profile recess and provided on the base plate preferably centrally in the longitudinal direction. On the other hand the through hole is positioned with respect to the profile recess preferably centrally and in the longitudinal direction is spaced apart from the journal bearing eccentrically on the base plate.

The journal bearings can be welded to the base plate. A particularly stable and, in addition, space saving connection is accomplished when the journal bearing exhibits a flange with a rearward facing plug pin and is inserted with the plug pin until abutment of the flange in the bore of the base plate and is then welded therewith. A bearing eye can be seated upon each journal bearing, which is preferably releasably secured to the carrier frame, preferably by threaded fastener means. In order to dampen the vibrations occurring during pump operation, the bearing eye is padded with a preferably elastically deformable plastic towards the journal bearing.

BRIEF DESCRIPTION OF THE DRAWINGS

In the following the invention will be described in greater detail on the basis of an illustrated embodiment shown in schematic manner in the figures. There is shown:

FIG. 6b A section along the section line B-B of FIG. 6a;

DETAILED DESCRIPTION OF THE INVENTION

Figure 1:
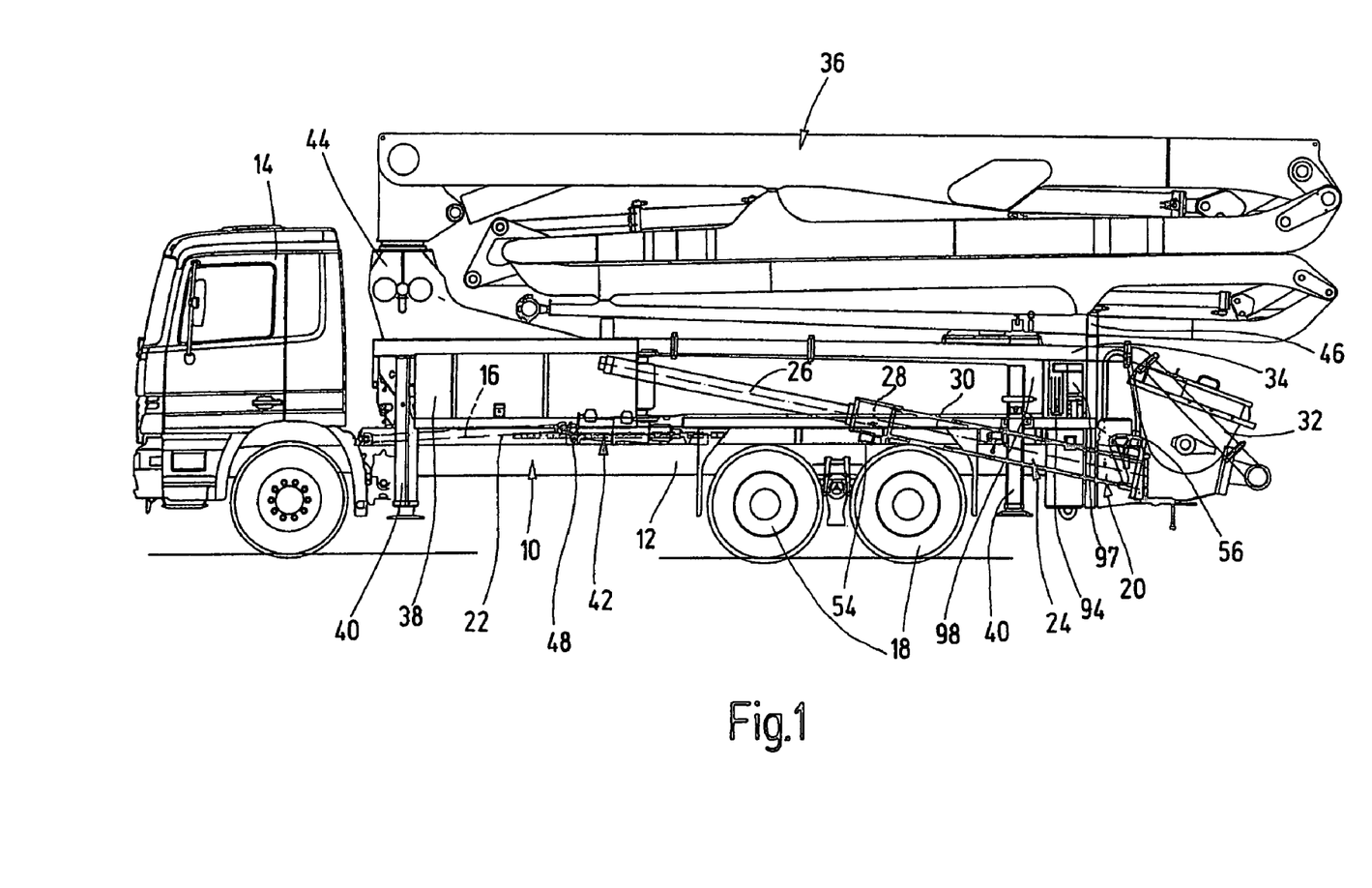
FIG. 1 A side view of a mobile concrete pump.
Figure 2:
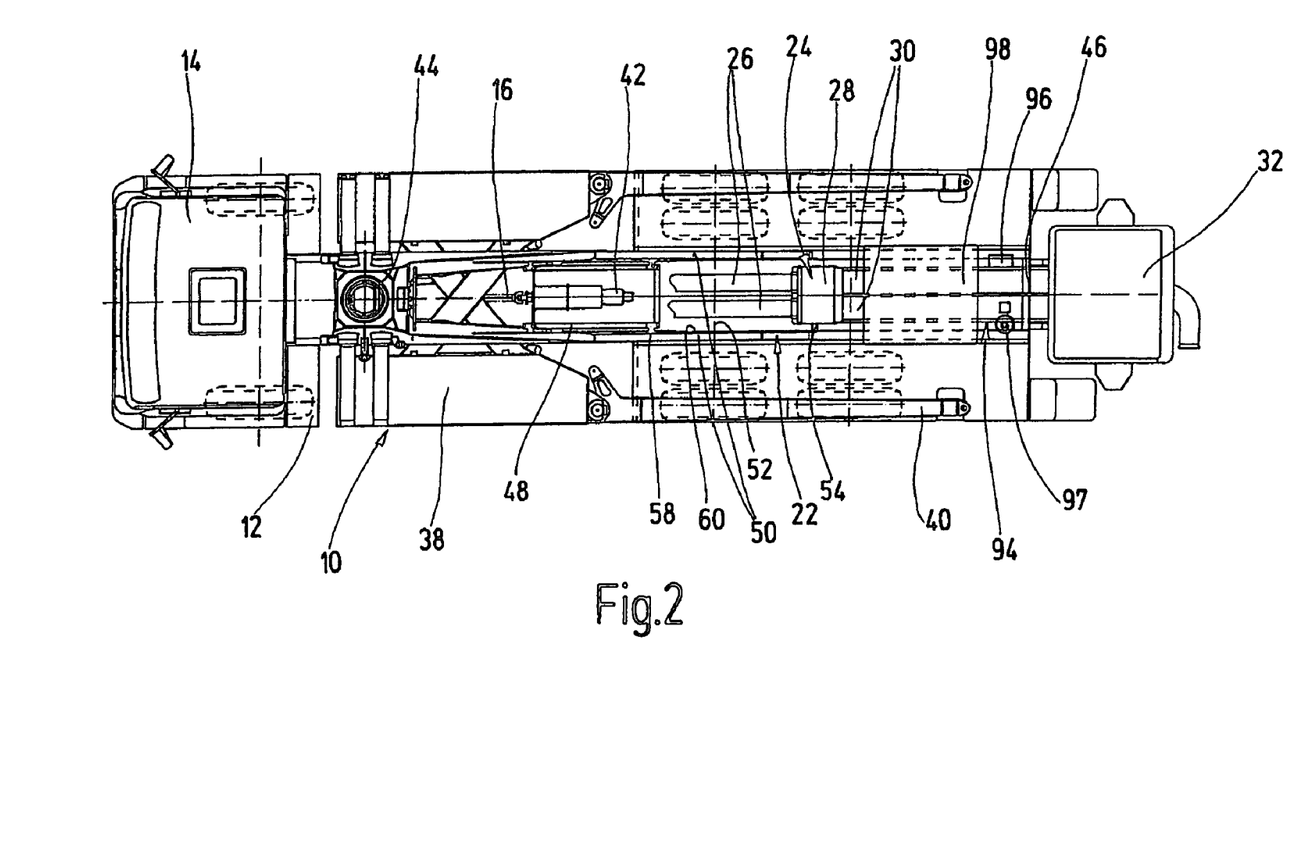
FIG. 2 A top view upon the mobile concrete pump according to FIG. 1 with a stylized distribution boom in partially sectioned representations.

The mobile concrete pump shown in FIGS. 1 and 2 includes a truck chassis 10 with a motor driven chassis structure 12 and a driver cabin 14, of which the motor drive can be coupled to the rear axles 18 via a drive shaft 16. The chassis 10 carries a concrete pump 20, which is connected via a building frame 22 with the structure 12. The concrete pump assembly essentially includes a core pump 24 with two hydraulic drive cylinders 26, two conveyor cylinders 30 connected pair wise with the drive cylinders 26 via a water box 28, and a material supply container 32 provided rigidly on the other end of the conveyor cylinder 30. The assembly further includes a pressure conveyance line 34, which runs along a distribution mast 36 which is an articulated mast and includes an end hose on the end of the last mast arm for emission of conveyed concrete to the location being concretized. The distribution mast 36 is mounted rotatably about a vertical axis on a mast rotation bearing block 44 rigidly connected with the building frame 22 in the vicinity of one end. On the rearward end of the building frame 22 a mast receiving bearing 46 is provided, upon which the distribution mast 36 rests in the folded together transport condition. Further, a stabilizing device 38 with extendable support legs 40 is provided. During concretizing operation the support legs are deployed and supported on the ground, lifting the structure 12. The hydraulic drive of the core pump 24, the distribution mast 36 and the support legs 40 occurs via a drive subassembly 42, comprised of hydraulic pumps 44, which are drivable via a drive shaft 16 coming from the vehicle motor.

The drive subassembly 42 is mounted upon a carrier frame 48, which in practice is referred to a "drive stool". Depending upon the type of pump, pump power, manner and size of support device, various types of drive subassembly 42 could be needed. In addition, carrier frames 48 may be in various sizes to accommodate the type of drive subassembly 42 used.

The building frame 22 includes two longitudinal side members 50, which are fixed upon the structure 12, spaced apart sideways from each other to thereby form a free space 52. The free space 52 is so dimensioned that the core pump 24 extends diagonally therethrough. The core pump lies, in the area of the water box 28, on a cross beam 54 bridging over the free space 52, with its ends welded or screwed to the longitudinal side members 50, which cross beam has on its upper surface a flat plastic coating 55. The cross beam 54 functions as a floating bearing for the core pump, which is besides this fixed, on the rearward end of the building frame 22, to a frame-fixed bearing 56.

In the area of the floating bearing the core pump is secured with the aid of a capture mechanism 57, 57', 57", 57"' against lifting from the cross beam 54. In FIG. 9a-d various embodiments of this type of capture mechanism are illustrated: capture hook 57, bent lever 57', cotter pin with spring lock 57" and through bolt with wedge securing 57"'.

The fixed bearing 56 is located on two extension arms 59 of the material supply container 32 rigidly provided spaced apart from each other. Releasable couplings are provided on the fixed bearings, with various embodiments of 56a-h shown in FIGS. 10a-h:

56a a horizontal centering wedge, which is secured by a locking lever;
56b a vertical centering wedge, which is secured by a spring clip or a not shown pin;
56c a horizontal bolt, which is cushioned by a rubber-metal element shock absorber;
56d a vertical bolt, which is cushioned by a rubber-metal-element;
56e a switch coupling;
56f a wedge coupling without cushioning element;
56g a wedge coupling with cushioning element;
56h a hook coupling.

The capturing mechanisms in the area of the floating bearing shown in FIG. 9a-d as well as the coupling mechanisms in the area of the fixed bearing 56 shown in FIGS. 10a-h have the advantage, that they can be easily fixed or released.

Figure 3A:
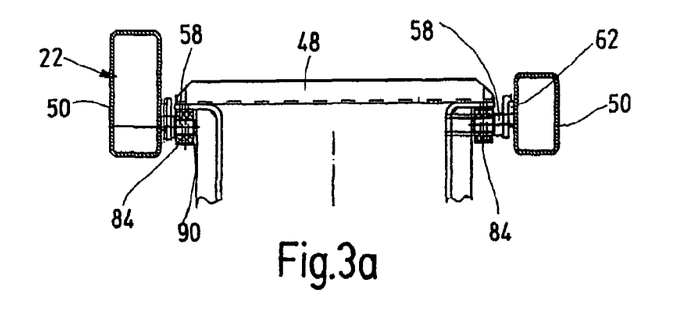
FIGS. 3a & 3b A section through the longitudinal side members (left and right different) of two building frames with various carrier frames.
Figure 3B:
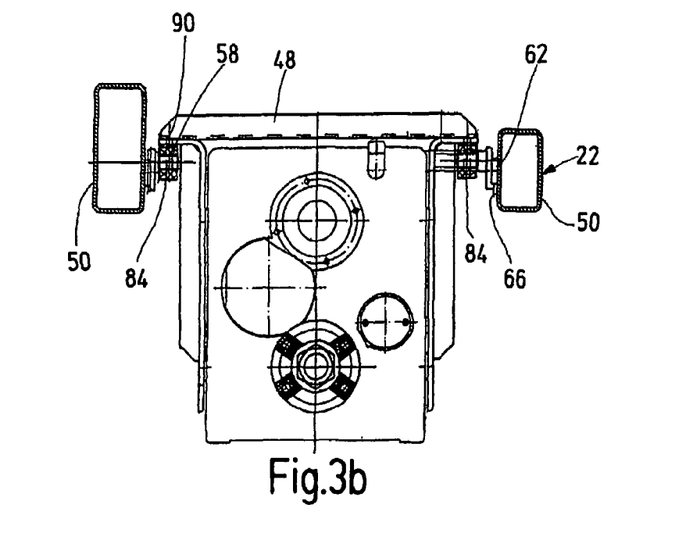
Figure 4A:
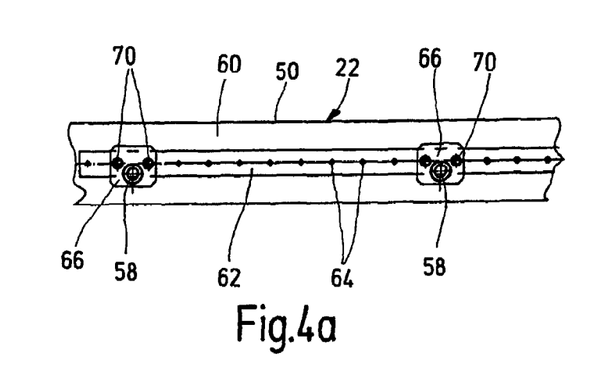
FIGS. 4a & 4b An elevated view of a longitudinal side member of the building frame according to FIGS. 3 & 3b (right) with various bearing arrangements.
Figure 4B:
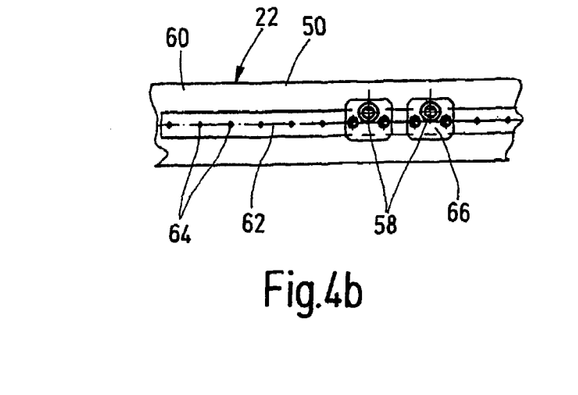

The carrier frame 48 is located below the forward end of the hydraulic drive cylinder 26 of the core pump 24. It is hung there within the free space 52 on at least four mounting bearings 58, which are secured to the inner surface 60 of the longitudinal side members 50 facing the free space 52 and facing in the direction of the free space 52. In order to be able to seat various sizes of carrier frame 48 on the one-and-the-same building frame 22, the longitudinal side members 50 carry on their inner surface 60 respectively one mounting rail 62, which has a square cross sectional profile and which exhibits screw holes 64 open toward the free space 52 in defined lock or detent spacing separation sequentially in the longitudinal direction. The journal bearings 58 carry for their part respectively one base plate 66, which exhibits two through holes 68 for the securing screws 70 provided spaced apart from each other in the spacing separation of the screw bore holes 64, with which they are securable in defined locations on the mounting rails 62. On their broadside opposite to the journal bearings 58 the base plate 66 exhibit an edge open profile recess 72 complimentary to the square shape of the mounting rails 62, via which they are form fittingly seatable upon the mounting rails 62 and securable with the securing screws 70 and the screw bore holes 64. As can be seen particularly in FIGS. 6a and b, the journal bearing 58 is provided eccentrically relative to the profile recess 72 and in the longitudinal direction centrally upon the base plate 66. On the other hand, the through holes 68 are central with respect to the profile recesses and, in the longitudinal direction, are eccentric, spaced apart from the journal bearings provided on the base plate 66. With this means it is accomplished that the base plates 66 are securable to the mounting rail with journal bearings provided offset either upwards (FIG. 3b, 4b, 5a) or downwards (FIG. 3a, 4a, 5b).

Figure 5A:
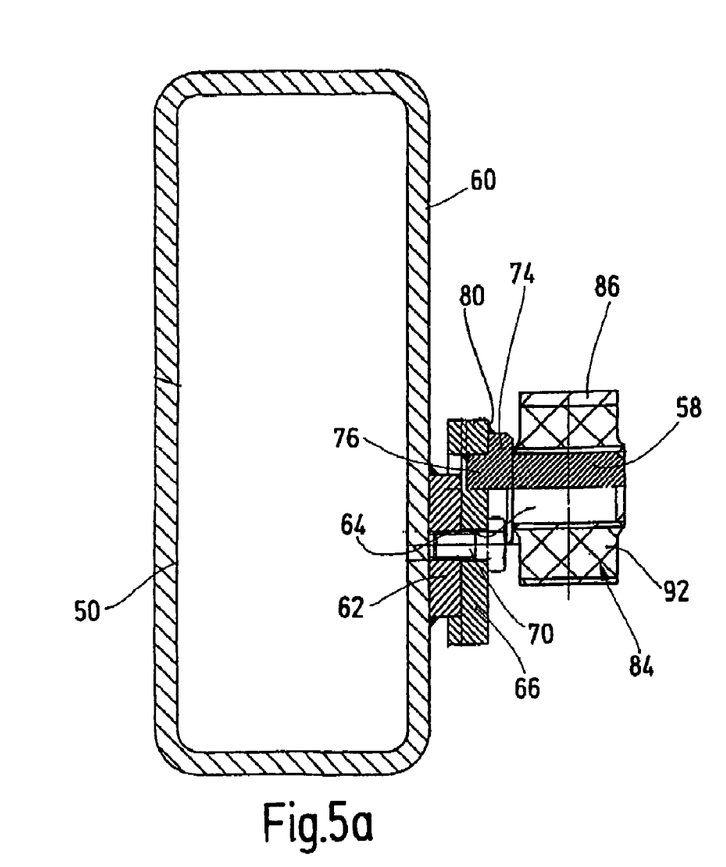
FIG. 5a A section through a longitudinal side member of the carrier frame according to FIG. 3b (left) in enlarged representation.
Figure 5B:
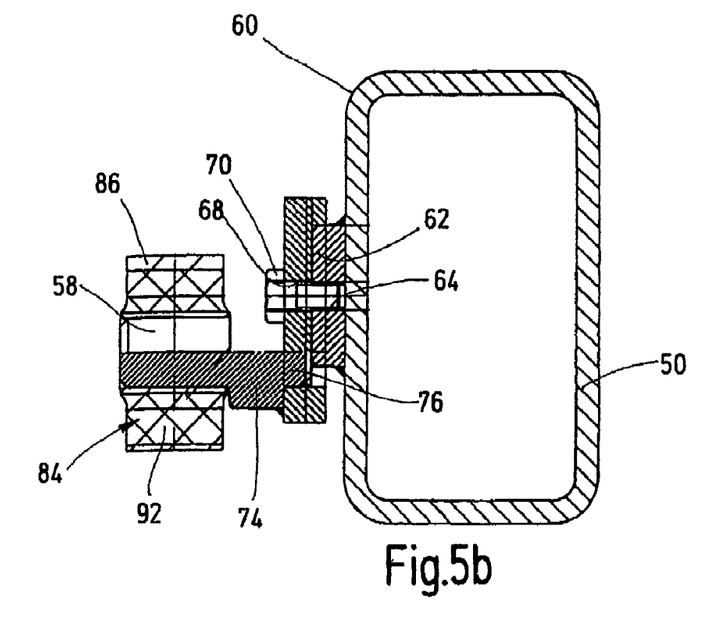
FIG. 5b A section through a longitudinal side member of the carrier frame according to FIG. 3a (right) in enlarged representation.
Figure 6A:
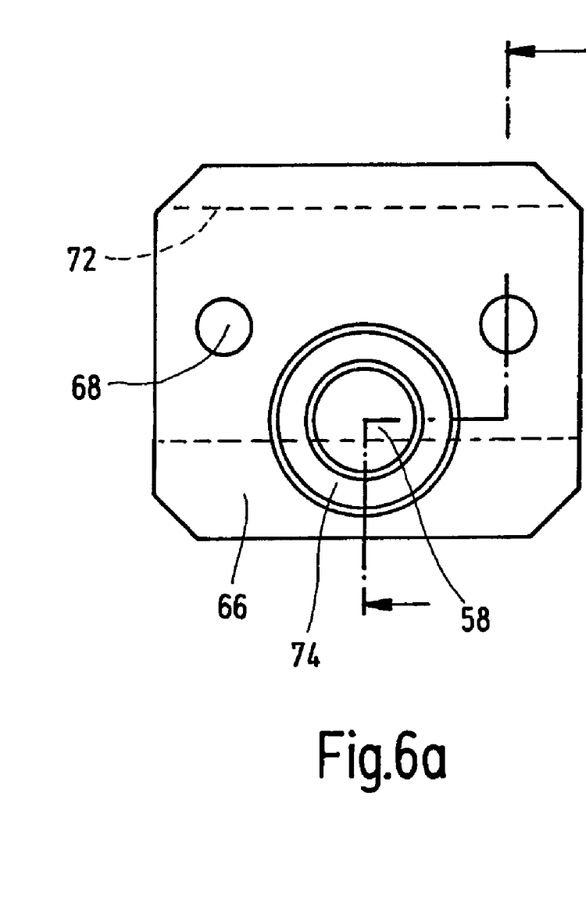
FIG. 6a A side view of a journal bearing with base plates.
Figure 6B:
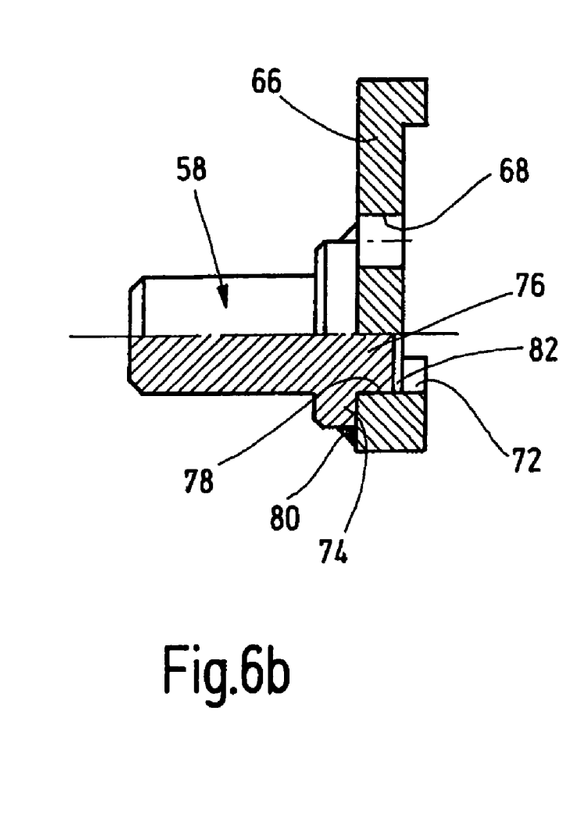
Figure 7A:
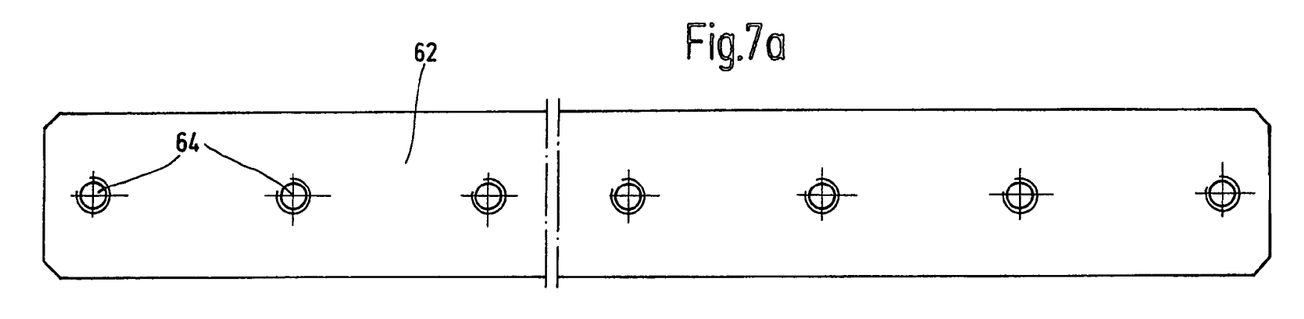
FIGS. 7a & 7b An elevated view and an edge view of a mounting guide rail.
Figure 7B:
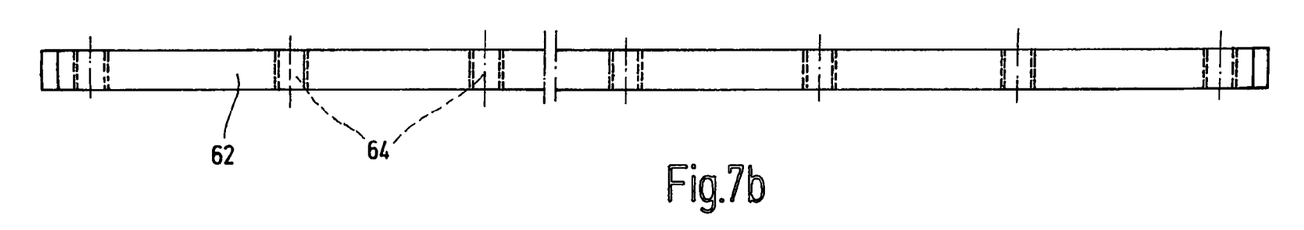

As can be seen from FIGS. 5a, b, 6b, the journal bearings 58 are welded on their base plate 66. The journal bearings exhibit for this purpose the flange 74 and a rearward plug pin 76. They are inserted with their plug pin 76 until abutment with the flange 74 in the bore 78 of the base plate and there are welded with the base plate via various welding seams 80, 82.

Figure 8A:
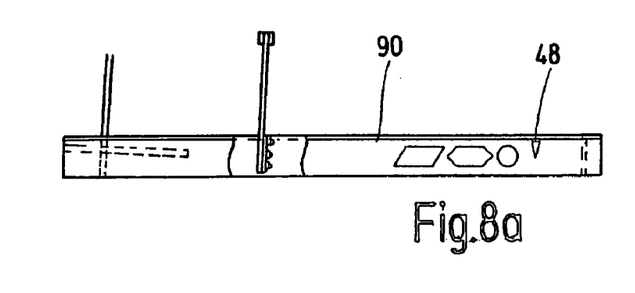
FIG. 8a-c A side view, an end view and a top view of a carrier frame for the drive subassembly.
Figure 8B:
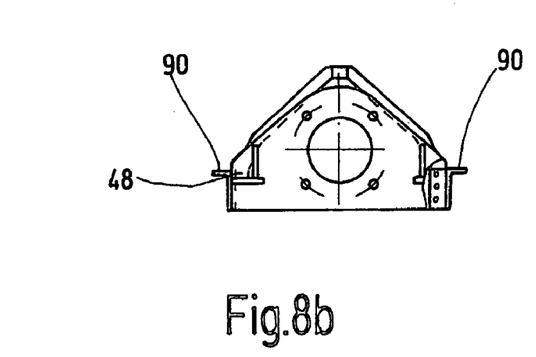
Figure 8C:
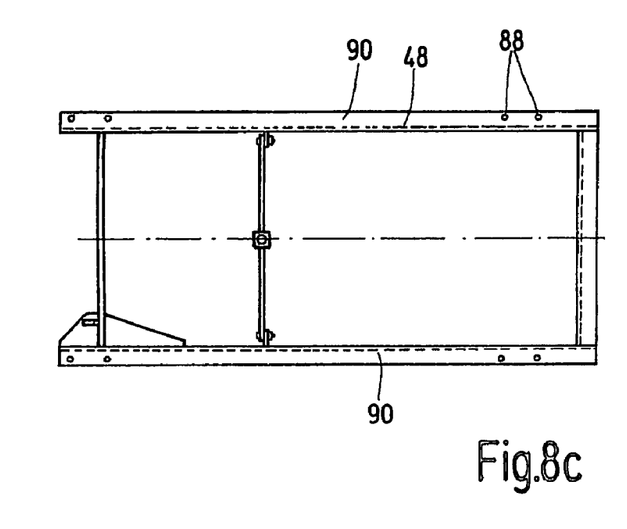
Figure 9A:
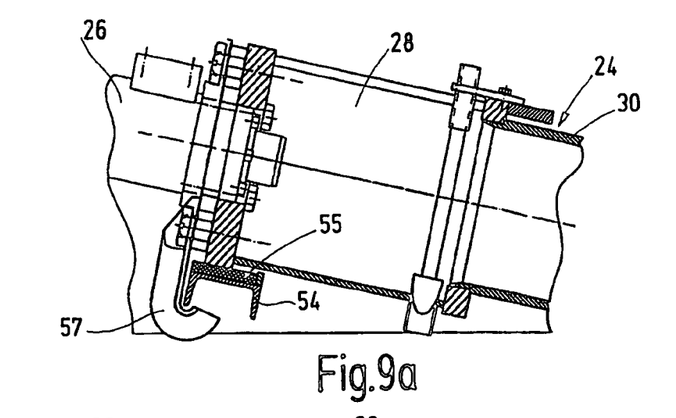
FIG. 9a-d A section of FIG. 1 in the area of the floating bearing with various means for securing against lifting off.
Figure 9B:
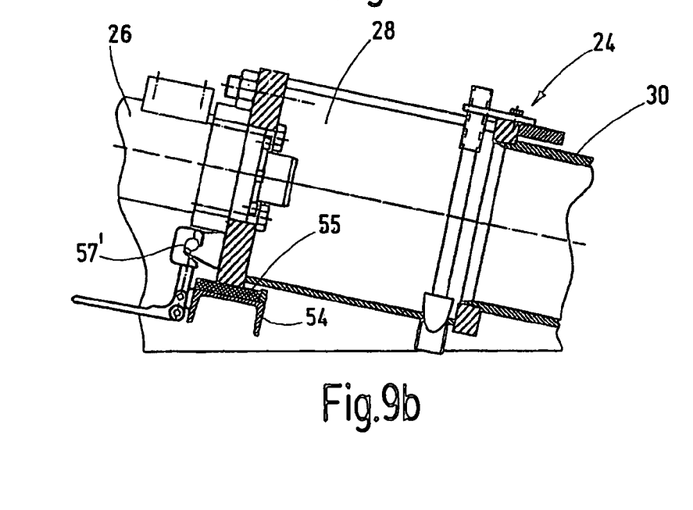
Figure 9C:
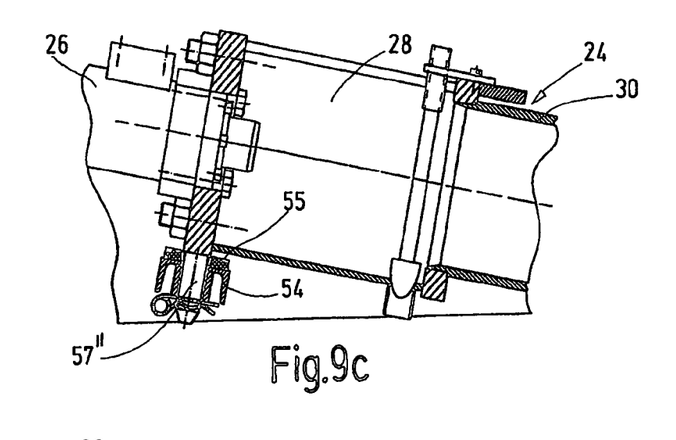
Figure 9D:
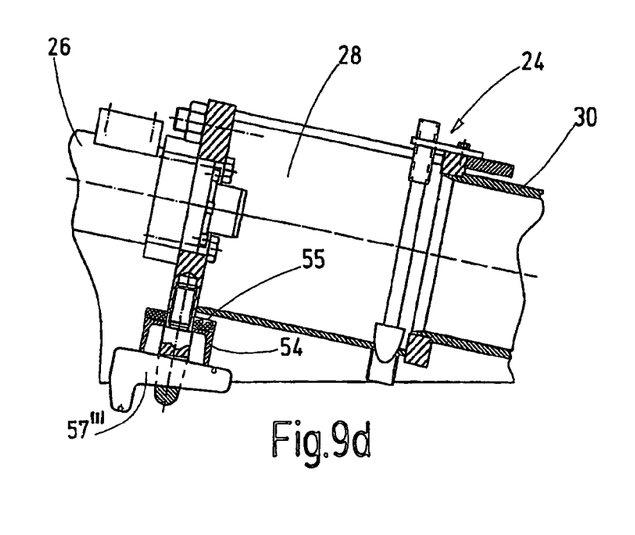
Figures 10A, 10B:
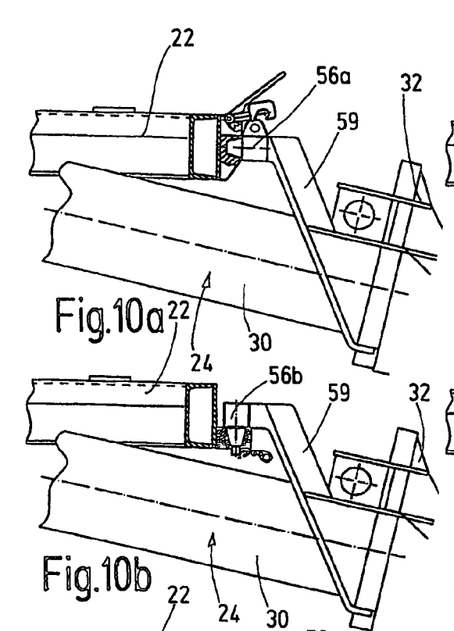
FIG. 10a-h A section from FIG. 1 in the area of the fixed bearing with various coupling devices
Figure 10C:
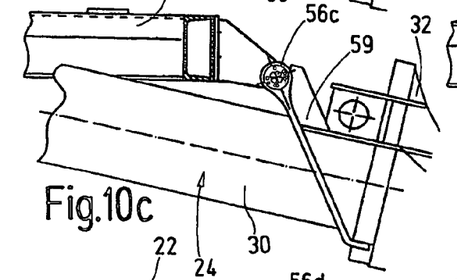
Figures 10D, 10H:
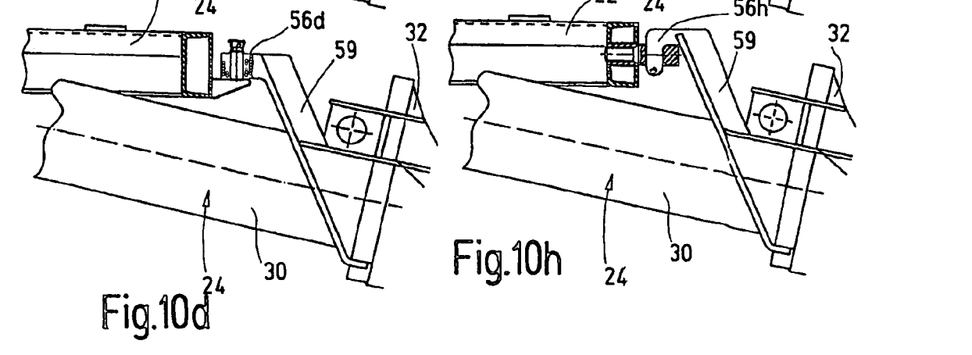
Figures 10E, 10F:
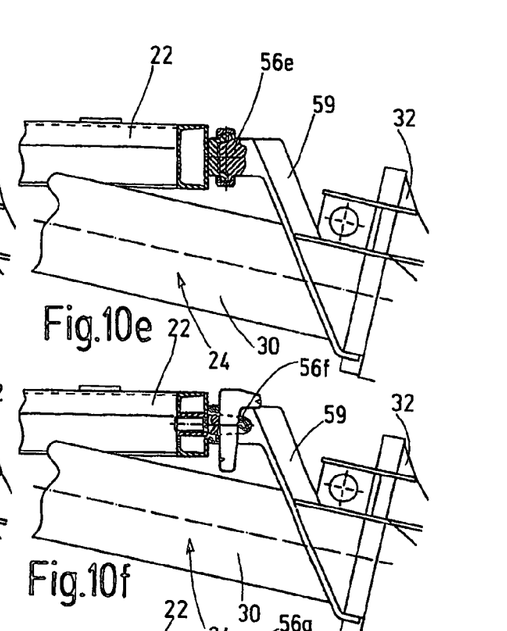
Figure 10G:
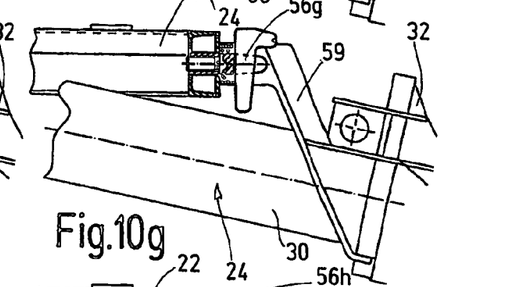

On each journal bearing 58 a bearing eye 84 is insertable or seatable, which for its part is provided with a fastener or mount 86, with which is securable in a screw position 88 provided for this purpose (FIG. 8c) on one of the carrier or bearing flanges 90 of the carrier frame 48. Depending upon the breadth of the carrier frame 48, journal bearings 58 with various thicknesses of flange 74 can be employed (compare FIGS. 5a and b). For absorbing or cushioning the vibration occurring during the puming process, the bearing eyes 84 are padded with an elastomeric material 92 towards the journal bearing 58. As can be seen from FIG. 3a, b as well as 4a, b, various carrier frames can be mounted with simple means on the mounting rails 62 of the building frame 22, which makes possible the varying of the positions and orientations of the journal bearings 58.

The hydraulic and electrical control and circuit elements for the drive subassembly 42 and for the functional units connected thereto, such as core pump 24, outrigger or support device 38 and distribution mast 36 are assembled into a control module 94 provided in the rear area of the building frame 22. The control module 94 includes, among other things, the hydraulic valves and/or hydraulic reservoir 94 necessary for the control, preferably assembled into a hydraulic control block 96. The hydraulic and electric lines leading from the control module 94 to the drive subassembly 42 are laid along the inner side of the longitudinal side members 54 of the building frame 22 and can be coupled or decoupled via plug connections for assembly and disassembly in simple manner. Further, in the rear portion of the building frame 22 ahead of the control module 94 there is a large water tank 98 with integrated water pump. The water is needed for the final cleaning of the concrete pump following the pumping operation.

In conclusion, the following can be summarized: The invention concerns a mobile concrete pump comprising a building frame 22 which can be arranged on the structure 12 of a truck chassis 10 and serves to maintain a supporting device 38, a core pump 24 and functional units which form a distribution mast 36. The building frame 22 comprises two longitudinal side members 50 mutually spaced apart by a free space 52 and resting on said chassis structure 12. Said mobile concrete pump further comprises a driving assembly 42 for actuating the functional units, which are arranged with the core pump 24 in the free space zone 52 located between the two longitudinal side members 50. At least the core pump (24) can be easily mounted and dismounted from the building frame (22). For this, the building frame (22) is provided with a floating bearing 54 which links said side members across the free space, as well as a fixed bearing 56 arranged at the rear end of the building frome and serving to support releasably the core pump 24 which is pre-assembled in modular manner. The building frome further comprises mounting means 62 designed to support releasably supporting carrier frames 48 of different sizes which link said side members across the free space 52 and which may be equipped in modular manner with various driving subassemblies 42.

The originally filed patent claims are basically only one attempt at describing the invention. The invention is not limited to these claims, but rather can be varied in many ways in the framework of the disclosure. All new individual and combined characteristics in the description and/or figures are considered inventive.

The invention claimed is:

1. A mobile concrete pump comprising:
   a truck chassis including a frame,
   a building frame fixed to the frame of the truck chassis and comprising two longitudinal side members mutually spaced apart by a free space, and
   a stabilizing device with extendable support legs, a core pump with a material supply container, and a plurality of functional units which form a distribution mast mounted on said building frame,
   wherein a drive subassembly for actuating the plurality of functional units, and the core pump, are located in the free space between the two longitudinal side members, and
   wherein the building frame comprises a floating bearing linking said side members across the free space, as well as a releasable fixed bearing arranged at the rear end of the building frame for releasably supporting the core pump for removal of the core pump from the building frame,
   wherein the core pump is prefabricated in a modular manner, and the material supply container is rigidly connected with the core pump,
   wherein the core pump is prefabricated and can be introduced from the back end of the building frame through the free space and is connectable with the floating bearing and the fixed bearing.

2. The mobile concrete pump according to claim 1, wherein the building frame includes slide rails leading to the floating bearing and the fixed bearing for facilitating the installation and removal of the core pump.

3. The mobile concrete pump according to claim 1, wherein the floating bearing is a cross beam, bridging over the free space, upon which the core pump rests.

4. The mobile concrete pump according to claim 1, wherein the core pump is supported, in the area of the floating bearing, on the sides against the longitudinal side members by rubber elastic vibration absorbers.

5. The mobile concrete pump according to claim 1, wherein the core pump is secured against lifting off from the floating bearing.

6. The mobile concrete pump according to claim 5, wherein, for securing against lifting off, the core pump is connectable with the floating bearing by a capture or lock mechanism connection.

7. The mobile concrete pump according to claim 1, wherein the core pump is a hydraulically driven piston pump having a water box, and resting with its water box upon the floating bearing.

8. The mobile concrete pump according to claim 1, wherein the floating bearing is positionable upon the longitudinal side members in various locations spaced apart from each other in the longitudinal direction.

9. The mobile concrete pump according to claim 3, wherein the cross beam forming the floating bearing is rigidly connected to the longitudinal side members.

10. The mobile concrete pump according to claim 1, wherein the material supply container includes at least one extension arm releasably and rigidly connectable with the fixed bearing of the building frame.

11. The mobile concrete pump according to claim 10, wherein the fixed bearing includes a rubber elastic cushioning or shock absorbing element.

12. The mobile concrete pump according to claim 1, wherein the building frame includes mounting means for releasably receiving carrier frames of various sizes, the carrier frames bridging over the free space, and modularly equippable with more than one type of a drive subassembly.

13. The mobile concrete pump according to claim 1, wherein a plurality of hydraulic control elements or electric control and circuit elements for the drive subassembly and the plurality of functional units connected to the drive subassembly are assembled into a control module that is provided at the rearward area of the building frame.

14. The mobile concrete pump according to claim 13, wherein the control module includes a plurality of assembled hydraulic valves and a hydraulic reservoir assembled into a hydraulic controlled block as necessary for control.

15. The mobile concrete pump according to claim 13, wherein a plurality of hydraulic lines associated with the plurality of hydraulic and electric control and circuit elements lead from the control module to the drive subassembly and run on the longitudinal side members of the building frame.

16. The mobile concrete pump according to claim 1, wherein the inner surfaces of the longitudinal side members facing the free space are each provided with a rigidly connected mounting rail extending in the longitudinal direction, wherein at least two journal bearings are provided spaced apart from each other on the longitudinal side members projecting transverse in the free space for receiving the carrier frame for the drive subassembly and wherein the journal bearings each carry a base plate, with which they are releasably securable to the mounting rails.

17. The mobile concrete pump according to claim 16, wherein the mounting rails include screw bore holes open transverse to the free space provided spaced apart from each other in the longitudinal direction in defined detent separations, and wherein the base plates exhibit at least two through holes provided spaced apart from each other corresponding to the detent separation of the screw bore holes for securing screws.

18. The mobile concrete pump according to claim 17, wherein the mounting rails have a square cross section profile, and wherein the base plates on their broad side opposite to the journal bearings exhibit an edge open profile recess complimentary to the square profile, with which they are form fittingly seatable upon the mounting rails and securable thereto via the securing screws.

19. The mobile concrete pump according to claim 18, wherein the journal bearings are provided eccentrically relative to the profile recess and, in the longitudinal direction, are centrally located on the base plate.

20. The mobile concrete pump according to claim 18, wherein the through holes are provided centrally relative to the profile recess, and eccentrically in the longitudinal direction, spaced apart from the journal bearings, on the base plate.

21. The mobile concrete pump according to claim 16, wherein the journal bearing is welded to the base plate.

22. The mobile concrete pump according to claim 21, wherein the journal bearing includes a flange and a backwards facing plug pin and is inserted with the plug pin in the bore of the base plate until abutment with the flange, and in this position is welded with the base plate.

23. The mobile concrete pump according to claim 16 wherein the mounting rails are welded to the longitudinal side members.

24. The mobile concrete pump according to claim 16, wherein a bearing eye is seated on each journal bearing, which is securable to the carrier frame.

25. The mobile concrete pump according to claim 24, wherein the bearing eye is padded towards the journal bearing with an elastic deformable plastic material.

* * * * *